June 11, 1968 L. B. CROUCH 3,387,403
TUBULAR COUPLING
Filed Dec. 9, 1965 2 Sheets-Sheet 1
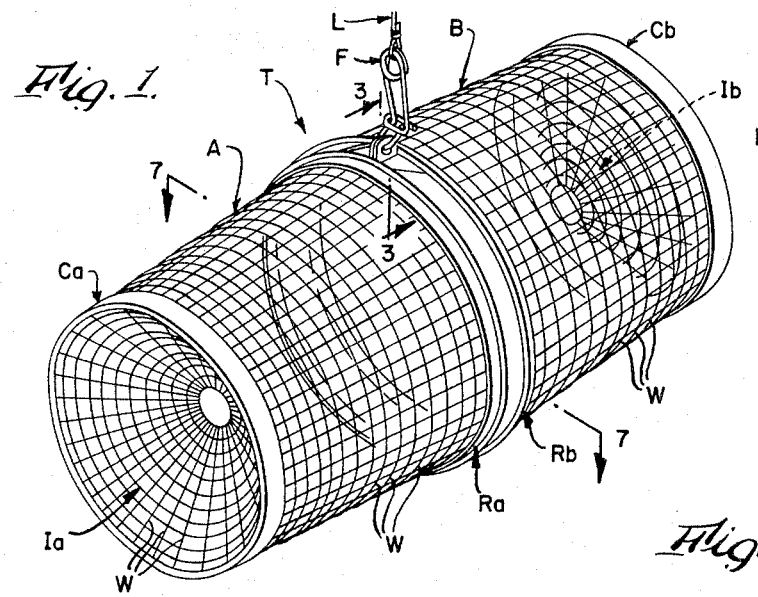
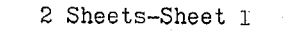
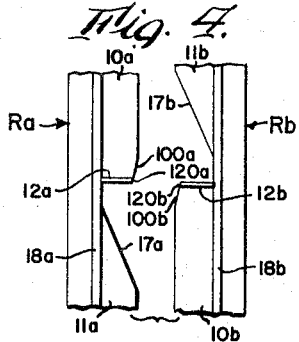
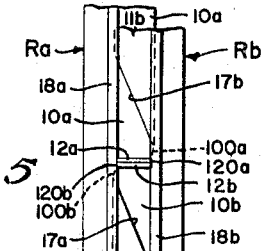
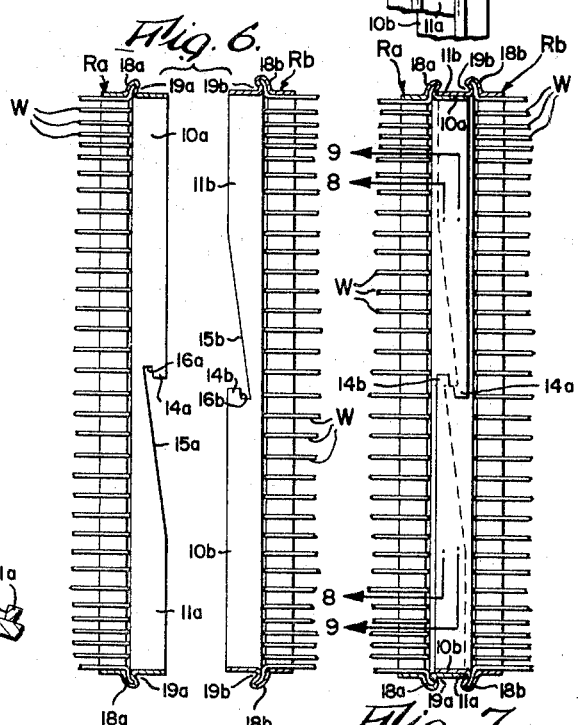
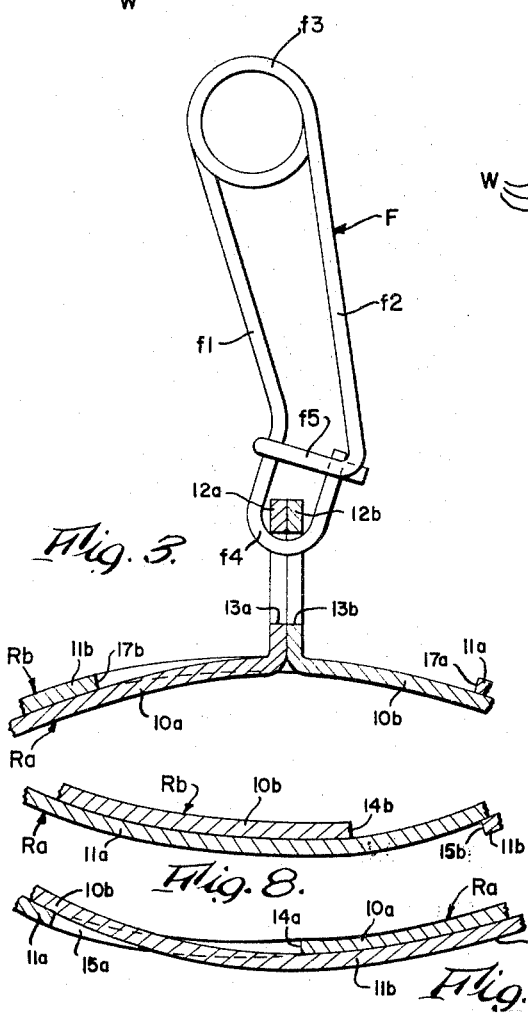
INVENTOR.
Lindsley B. Crouch
BY
Popp and Sommer
ATTORNEYS June 11, 1968     L. B. CROUCH     3,387,403
TUBULAR COUPLING Filed Dec. 9, 1965     2 Sheets-Sheet 2

INVENTOR.
Lindsley B. Crouch
BY
Popp and Sommer
ATTORNEYS

United States Patent Office 3,387,403
Patented June 11, 1968

3,387,403
TUBULAR COUPLING
Lindsley B. Crouch, Fillmore, N.Y., assignor to Cuba Specialty Manufacturing Co., Inc., Houghton, N.Y., a corporation of New York
Filed Dec. 9, 1965, Ser. No. 512,757
10 Claims. (Cl. 43—65)

This invention relates to improvements in tubular couplings and more particularly to a new and improved coupling for joining two tubular members, such as the halves of a minnow trap.

While not restricted thereto, the present invention is particularly adapted for use in joining the two halves of a minnow trap. As is well known, such minnow traps include two identical halves, each being formed of wire mesh in frusto-conical tubular shape with their larger ends removably joined and their smaller ends provided with reentrant conical minnow inlets formed of wire mesh. Normally, the larger ends of the halves are provided with wire hoops which are upset to form mating male and female loops adjacent their lower ends for assembly and disassembly, as well as mating, radially facing loops or ears at their upper ends for receiving a snap fastener which is attached to the line for lowering and raising the trap in the water. This conventional coupling structure has certain disadvantages. First, the use of such wire hoops increases the cost of manufacturing the traps. Second, the joint between the hoops is loose, resulting in an undesirable gap and relative movement between the halves. This relative movement includes the tendency of the halves to rock about their axes relative to one another, as well as to separate, thereby concentrating strain on the snap fastener and increasing the likelihood of unlocking the same.

Accordingly, a primary object of the present invention is to provide a new and improved coupling which is designed to overcome the various disadvantages of such conventional coupling.

Another object is to provide a coupling which eliminates such wire hoops to reduce the manufacturing cost of such traps.

A further object is to provide a coupling which forms a more rigid, close fitting joint between the halves to eliminate the undesirable gap and minimize relative movement therebetween, by eliminating the tendency of the halves to rock about their axes relative to one another and by minimizing the tendency of the halves to separate, thereby relieving strain on the snap fastener, which only is required to prevent actual separation of the halves.

Still another object is to provide a coupling which is designed to ensure against accidental unlocking of the fastener and separation of the trap halves.

Additional objects and advantages of the invention will become apparent upon consideration of the following detailed description and accompanying drawings, wherein:

FIG. 1 is an end perspective view of an assembled minnow trap incorporating a coupling constituting a preferred embodiment of the invention;

FIG. 3 is an enlarged fragmentary vertical section taken on line 3—3 of FIG. 1 and showing how the outstanding ears on the assembled coupling rings are secured by the snap fastener;

FIG. 4 is an enlarged fragmentary top plan view of the top portions of the rings including the outstanding ears and adjacent flange portions prior to assembly;

FIG. 5 is a view similar to FIG. 4, but showing the overlapping flange portions and abutting ears after assembly;

FIG. 6 is an enlarged fragmentary horizontal sectional view through the rings and trap halves showing the bottom lugs and adjacent flange portions prior to assembly;

FIG. 7 is a view similar to FIG. 6, but taken on line 7—7 of FIG. 1 and showing the interlocking bottom lugs and overlapping flange portions after assembly;

FIG. 8 is an enlarged fragmentary sectional view taken along line 8—8 of FIG. 7 through the bottom lug of the right hand ring and showing the overlapping of the adjacent flange portions of both rings, and FIG. 9 is an enlarged fragmentary section taken on line 9—9 of FIG. 7 through the bottom lug of the left hand ring and showing the overlapping of the adjacent flange portions of both rings.

Figure 2:
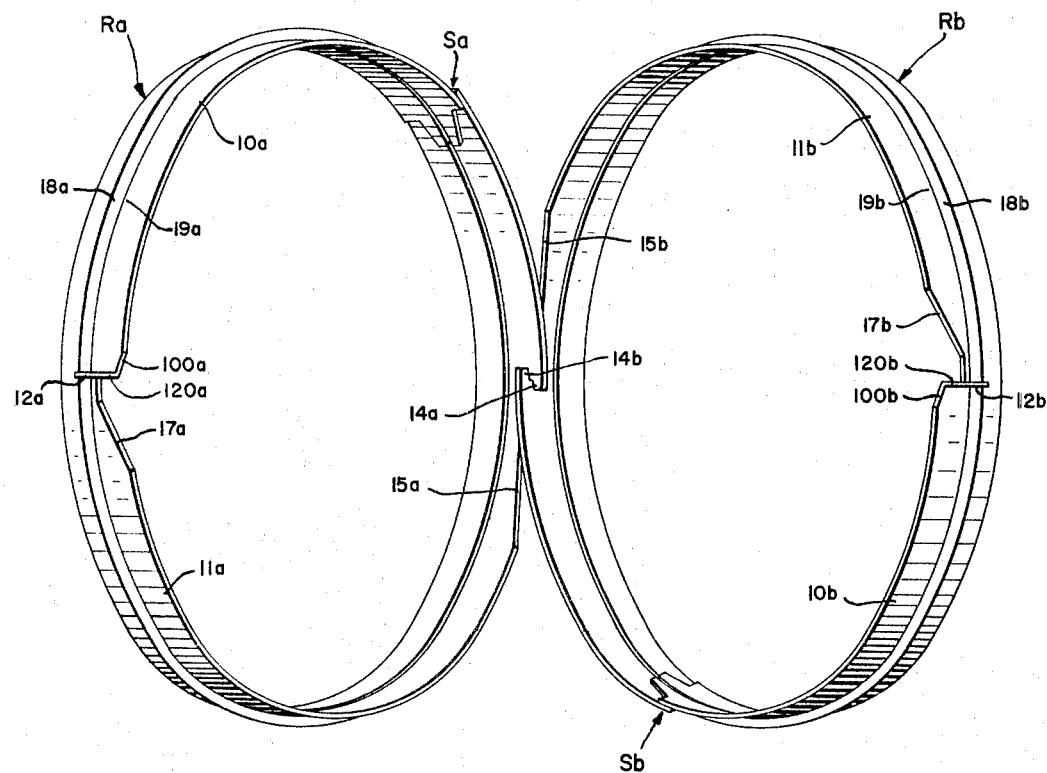
FIG. 2 is an enlarged top perspective view showing how the bottom lugs on the coupling rings are first interlocked to start assembly.

Referring to the drawings, and particularly FIG. 1, a minnow trap T includes two identical halves A and B each formed of wire mesh W into a frusto-conical tubular shape. At their smaller ends, halves A and B are provided with sheet metal rings or collars $C_a$ and $C_b$ respectively crimped over the wire mesh W forming the main frusto-conical body portions and the reentrant open conical minnow inlets $I_a$ and $I_b$ respectively. At their larger ends, halves A and B are provided with sheet metal rings $R_a$ and $R_b$ respectively, which are joined in overlapping and interlocking relationship and removably held together by a wire snap fastener F, to which the line L for raising and lowering trap T is attached.

The rings $R_a$ and $R_b$ form the coupling constituting a preferred embodiment of the invention, and since these rings are identical, a detailed description of one will suffice for both. However, when brought together, these rings are reversed one with respect to the other, which enables joinder thereof in the manner hereinafter explained.

As best shown in FIG. 2, ring $R_a$ is conveniently formed of a single band of sheet metal which is spliced at $S_a$ and fastened in any suitable manner, such as by spot welding. When so formed, ring $R_a$ includes an axially outstanding annular flange which is divided into first and second semi-annular portions $10a$ and $11a$ respectively. It will be noted that the splice $S_a$ is located intermediate the ends of one of the flange portions, such as $10a$, in order to avoid an extra joint where the rings $R_a$ and $R_b$ are interlocked or abut for a closer fit as well as economy and simplicity of fabrication.

Flange portion $10a$ terminates at its upper end in a radially outstanding and axially extending ear $12a$ which is struck out from the flange portion and provided with a through hole $13a$ (FIG. 3). Ear $12a$ is made slightly narrower than flange portion $10a$, as shown in FIGS. 4 and 5, and its outer radial edge $120a$ is inset slightly from the free marginal edge of the flange portion, and which edge preferably tapers slightly inwardly at $100a$ to the ear, for a closer fit with ring $R_b$, as will be described in greater detail below. Continuing with FIG. 2, at its lower end, flange portion $10a$ is provided with a circumferentially extending lug $14a$. Adjacent to this lug, the free marginal edge of flange portion $11a$ is cut away at its lower end and tapers axially inwardly at $15a$ to form notch $16a$ (FIG. 6), to permit lug $14a$ to be formed and to facilitate assembly. The free marginal edge of flange portion $11a$ also is cut away at its upper end and tapers axially inwardly at $17a$ to form a cut-out adjacent the struck out ear $12a$ to facilitate assembly.

Ring $R_a$ may be joined to trap half A in any suitable manner, but as shown in FIGS. 6 and 7, is preferably folded upon itself so as to crimp the margin of the wire mesh W, thereby forming a generally radially outstanding, annular bead $18a$ extending circumferentially around the ring intermediate its marginal edges. This bead is so formed as to provide on one side an annular groove $19a$ extending circumferentially around the ring exteriorly of flange portions 10a and 11a.

The corresponding parts of ring Rb are designated by the same numerals except for the suffix b. As is evident from FIGS. 1–7, ring Rb is identical to ring Ra and is joined to trap half B in the same manner.

However, when these rings are brought together as shown in FIG. 2, they are reversed, one with respect to the other, and their circumferential flange portions are slightly distorted spirally so that when lug 14b is placed against the inside surface of flange portion 10a and lug 14a is placed against the inside surface of flange portion 10b, with the rings tipped apart at their upper ends, the rings may be subsequently tipped so their upper ends come together and the various flange portions interlock and overlap, as shown in FIGS. 5 and 7–9. When so assembled, lugs 14a and 14b interlock as shown in FIG. 7, with lug 14a fitting inside flange portion 11b as shown in FIG. 9, and lug 14b fitting inside flange portion 11a, as shown in FIG. 8. Likewise, flange portion 11b overlaps flange portion 10a, whereas flange portion 11a overlaps flange portion 10b.

As shown in FIGS. 5 and 7, the free marginal edge of flange portion 11a is received in groove 19b and the free marginal edge of flange portion 11b is received in groove 19a. Also the cut-out at 17a is closed by the underlying flange portion 10b, while the cut-out at 17b is closed by the underlying flange portion 10a. In addition, at the adjacent upper ends of flange portions 10a and 10b, ears 12a and 12b are arranged in side-by-side abutting relation.

In view of the fact that the outer radial marginal edges 120a and 120b of these are slightly inset, as noted above, the outer marginal edges of flange portions 11a and 11b are readily received in grooves 19b and 19a respectively, because the marginal ear edges 120a and 120b can fit closely adjacent or even abut beads 18b and 18a respectively at the top of the grooves, as shown in FIG. 5. While it is not absolutely necessary that the marginal edges of flange portions 10a and 10b be tapered at 100a and 100b respectively, since flange portions 10a and 10b fit inside flange portions 11b and 11a respectively, such taper is preferred to avoid interference with any rough edges which might be formed along the bottom of the grooves in striking out ears 12a and 12b.

Following assembly of trap halves A and B, as shown in FIG. 1, rings Ra and Rb are fastened together by any suitable means, but preferably by the one-piece wire snap fastener F of FIG. 3. The arms f1 and f2 are normally sprung apart by a coil spring f3 to the locked or engaged position shown, with the lower upstanding U-shaped portion f4 of arm f1 closed by the lateral U-shaped portion f5 of arm f2. In fastening abutting ears 12a and 12b, arms f1 and f2 are forced toward each other to free portion f4 which is passed through aligned holes 13a and 13b, and upon release of their arms, they snap to the locked position. Upon attachment of line L to fastener F, as shown in FIG. 1, the assembled trap T is ready for use.

It will now be apparent how the present invention accomplishes its various objects, and the numerous advantages of the invention likewise will be evident. For example, the elimination of the formerly used upset wire hoops by the single-piece sheet metal rings Ra and Rb substantially reduces the cost of manufacture. The interlocking and overlapping fit of rings Ra and Rb produces a more rigid close fitting joint and eliminates undesirable gaps between the trap halves. The interlocking lugs 14a and 14b together with the abutting ears 12a and 12b effectively eliminate any tendency of the trap halves to rock relatively about their axes. In addition, the fitting of flange portions 11a and 11b into grooves 19b and 19a respectively minimizes the tendency of the trap halves to separate, thereby relieving strain on the snap fastener. At the same time, the axial positioning of ears 12a and 12b ensures against accidental unlocking of the fastener F and separation of the trap halves because any tendency of the halves to separate is opposed across the thickness of fastener portion f4, as compared to radially facing ears which would tend to bend the free end of portion f4 out of portion f5.

While the inventive coupling has been described and illustrated herein by reference to a preferred embodiment employed in joining minnow trap halves, it is to be understood that various changes and modifications may be made in the invention by those skilled in the art, without departing from the inventive concept, the scope of which is to be determined by the appended claims.

What is claimed is:

1. A coupling for joining two tubular members and comprising a pair of rings severally connected to said members and removably joined together in overlapping and interlocking relationship, each ring including an annular, generally axially outstanding flange divided into first and second semi-annular portions, said first flange portion terminating at one end and having its opposite end provided with a generally circumferentially extending lug, said second flange portion being cut away at one end to provide a generally circumferentially extending notch adjacent said lug and being cut away at its opposite end to provide a cut-out adjacent said one end of said first flange portion, said rings being reversed and their flange portions being slightly distorted spirally so that said lug on said first flange portion of each ring interlocks with said lug on said first portion of the other ring and fits inside said first flange portion of the other ring, said second flange portion on each ring overlaps said first flange portion of the other ring, said one end on said first flange portion of each ring abuts said one end on said first flange portion of the other ring, and said first flange portion on each ring closes said cut out in said second flange portion of the other ring.

2. The coupling of claim 1 wherein said first flange portion terminates at said one end in a generally radially outstanding ear, and said ear on said first flange portion of each ring abuts said ear on said first flange portion of the other ring.

3. The coupling of claim 1 wherein each ring is folded upon itself to form a generally radially outstanding and generally circumferentially extending bead forming on one side a generally circumferentially extending groove exterior of said flange, the free marginal edge of said second flange portion of each ring being received in said groove in the other ring.

4. The coupling of claim 3 wherein said first flange portion on each ring terminates at said one end in a generally radially outstanding ear, said ear on said first flange portion of each ring abuts said ear on said first flange portion of the other ring.

5. A minnow trap including the coupling of claim 1 wherein said members are two halves of a minnow trap, each half being formed of wire mesh in frusto-conical tubular shape and having its larger end provided with one of said rings and an inlet at its smaller end.

6. The minnow trap of claim 5 wherein said first flange portion on each ring terminates at said one end in a generally radially outstanding perforated ear, said ear on said first flange portion of each ring abuts said ear on said first flange portion of the other ring, and means extends through said ears removably fastening said rings and minnow trap halves together.

7. The minnow-trap of claim 5 wherein each ring is folded upon itself to crimp the margin of the wire mesh at said larger end of each minnow trap half and to form a generally radially outstanding and generally circumferentially extending bead forming on one side a generally circumferentially extending groove exterior of said flange, the free marginal edge of said second flange portion of each ring being received in said groove in the other ring.

8. The minnow trap of claim 7 wherein said first flange portion on each ring terminates at said one end in a generally radially outstanding perforated ear, and said ear on said first flange portion of each ring abuts said ear on said first flange portion of the other ring, and means extends through said ears removably fastening said rings and minnow trap halves together.

9. The minnow trap of claim 8 wherein each of said flanges is formed of one piece joined intermediate the ends of one of said flange portions, said free marginal edge of each of said second flange portions tapers generally axially inwardly at its ends to form said notch at said one end and said cut out at said opposite end, and each of said ears is struck out from said first flange portion at said one end.

10. The minnow trap of claim 9 wherein each of said ears extends generally axially and is narrower than said first flange portion with its outer radial marginal edge inset from the free marginal edge of said first flange portion to permit said free marginal edge of said second flange portion of each ring to enter said groove in the other ring.

References Cited

UNITED STATES PATENTS

| | | | |
|---|---|---|---|
| 798,670 | 9/1905 | Gee | 43—65 |
| 897,589 | 9/1908 | Connevey | 43—65 |
| 2,076,972 | 4/1937 | Tucker | 43—65 |
| 3,271,849 | 9/1966 | Manno et al. | 43—100 X |

FOREIGN PATENTS 956,548  4/1964  Great Britain.

SAMUEL KOREN, *Primary Examiner.*

W. H. CAMP, *Assistant Examiner.*